UNITED STATES PATENT OFFICE.

ALFRED FELDMANN, OF BREMEN, GERMANY.

PROCESS OF MANUFACTURING AMMONIA.

SPECIFICATION forming part of Letters Patent No. 337,387, dated March 9, 1886.

Application filed September 10, 1884. Serial No. 142,673. (No specimens.) Patented in France August 27, 1884, No. 163,979; in England August 27, 1884. No. 11,711; in Germany August 28, 1884, No. 31,237; in Italy September 30, 1884, XXXIV, 372, and in Austria-Hungary November 13, 1884, No. 32,575 and No. 51,449.

*To all whom it may concern:*

Be it known that I, ALFRED FELDMANN, doctor of philosophy, a subject of the Emperor of Germany, residing at Bremen, German Empire, have invented certain new and useful Improvements in the Process of Manufacturing Ammonia; and I do hereby declare the following to be a full, clear, and exact description of the invention, such as will enable others skilled in the art to which it appertains to make and use the same.

In the manufacture of spirits of sal-ammoniac the ammoniacal liquor—especially the ammoniacal water obtained in the dry distillation of bones, coal, peat, &c.—is mixed with caustic lime and either subjected to direct distillation or allowed to settle, and the clear liquor then subjected to distillation. In either case lime or lime slimes will be present in greater or less quantities in the stills, which render the complete distillation of the ammoniacal constituents of the liquor very difficult, and the later elimination of the lime residues is not only a very tedious but also a very disagreeable operation.

The object of this invention is to obviate these difficulties; and it consists in mechanically eliminating the insoluble lime combinations formed by the action of the caustic lime either by means of a filter-press or in a centrifugal machine.

In carrying out my invention the crude ammoniacal water or gas-water is first treated with milk of lime or dry hydrate of lime in well-known proportions and in any usual or preferred manner. When the decomposition is complete, I treat the caustic ammoniacal liquor in a centrifugal machine or a filter-press, to free the liquor from its sulphur combinations, and then subject the liquor to distillation in any suitable distilling apparatus, preferably such as are adapted to operate continuously. The same method may be applied to the production of concentrated ammoniacal or gas water.

In the continuous-operating distilling apparatus heretofore employed an ammoniacal liquor of a strength of about twelve to fifteen per cent. in ammonia has been obtained. Any attempt to obtain a liquor of greater concentration has resulted in the separation of carbonate of ammonia and the obstruction of the cooling devices; but when the carbonate of the ammoniacal combinations in crude ammoniacal liquors is precipitated by means of caustic lime and the resultant insoluble lime combinations removed before distilling the liquor, as above stated, the said liquor may be treated in any usual continuously-operating distilling apparatus, and a liquor of any desired degree of concentration obtained, whereby a merchantable product is directly obtained.

In the production of concentrated ammoniacal liquors it is only necessary to decompose a portion of the carbonate of ammonia by means of lime, sufficiently so to prevent the distillate at the point of greatest concentration to crystallize in and obstruct the cooling apparatus.

Having now particularly described my said invention, what I claim as new, and desire to secure by Letters Patent, is—

In the manufacture of spirits of sal-ammoniac or of highly-concentrated ammoniacal water, which consists in first treating the crude ammoniacal liquor or gas-water with lime in the usual manner, effecting the separation of the lime and lime combinations from the liquor by mechanical filtration, in contradistinction to the usual mode of separation by precipitation and decanting, whereby an ammoniacal liquor free from lime and lime combinations is obtained for the purposes specified.

In testimony whereof I affix my signature in presence of two witnesses.

ALFRED FELDMANN.

Witnesses:
A. DEMCLIUS,
B. ROI.